United States Patent
Ahn et al.

(10) Patent No.: US 8,873,831 B2
(45) Date of Patent: Oct. 28, 2014

(54) WALKING ROBOT AND SIMULTANEOUS LOCALIZATION AND MAPPING METHOD THEREOF

(75) Inventors: Sung Hwan Ahn, Anyang-si (KR); Kyung Shik Roh, Seongnam-si (KR); Suk June Yoon, Seoul (KR); Seung Yong Hyung, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 430 days.

(21) Appl. No.: 13/326,680

(22) Filed: Dec. 15, 2011

(65) Prior Publication Data

US 2012/0155775 A1    Jun. 21, 2012

(30) Foreign Application Priority Data

Dec. 21, 2010 (KR) .................. 10-2010-0131790

(51) Int. Cl.
*G06K 9/00* (2006.01)
*G06T 7/00* (2006.01)

(52) U.S. Cl.
CPC .................. *G06T 7/0042* (2013.01)
USPC .......................................................... 382/153

(58) Field of Classification Search
USPC ........... 382/103, 153; 700/245, 250, 253, 259
See application file for complete search history.

(56) References Cited

U.S. PATENT DOCUMENTS

| | | | | | |
|---|---|---|---|---|---|
| 4,593,366 | A | * | 6/1986 | Sugimoto et al. | 700/262 |
| 6,560,512 | B1 | * | 5/2003 | Rosen et al. | 700/258 |
| 7,257,237 | B1 | * | 8/2007 | Luck et al. | 382/103 |
| 7,386,163 | B2 | * | 6/2008 | Sabe et al. | 382/153 |
| 8,086,419 | B2 | * | 12/2011 | Goncalves et al. | 702/152 |
| 8,457,830 | B2 | * | 6/2013 | Goulding | 701/26 |
| 8,744,665 | B2 | * | 6/2014 | Shin et al. | 701/28 |
| 2004/0230340 | A1 | * | 11/2004 | Fukuchi et al. | 700/245 |
| 2010/0094463 | A1 | * | 4/2010 | Okabayashi et al. | 700/264 |
| 2010/0241289 | A1 | * | 9/2010 | Sandberg | 701/2 |
| 2012/0327194 | A1 | * | 12/2012 | Shiratori et al. | 348/47 |
| 2013/0079929 | A1 | * | 3/2013 | Lim et al. | 700/250 |
| 2013/0131865 | A1 | * | 5/2013 | Yamane | 700/254 |

* cited by examiner

*Primary Examiner* — Ishrat I Sherali

(74) *Attorney, Agent, or Firm* — Staas & Halsey LLP

(57) ABSTRACT

A walking robot and a simultaneous localization and mapping method thereof in which odometry data acquired during movement of the walking robot are applied to image-based SLAM technology so as to improve accuracy and convergence of localization of the walking robot. The simultaneous localization and mapping method includes acquiring image data of a space about which the walking robot walks and rotational angle data of rotary joints relating to walking of the walking robot, calculating odometry data using kinematic data of respective links constituting the walking robot and the rotational angle data, and localizing the walking robot and mapping the space about which the walking robot walks using the image data and the odometry data.

20 Claims, 12 Drawing Sheets (a)          (b)

(a)

(b)

(a)

(b)

(c)

(a)          (b)          (c)

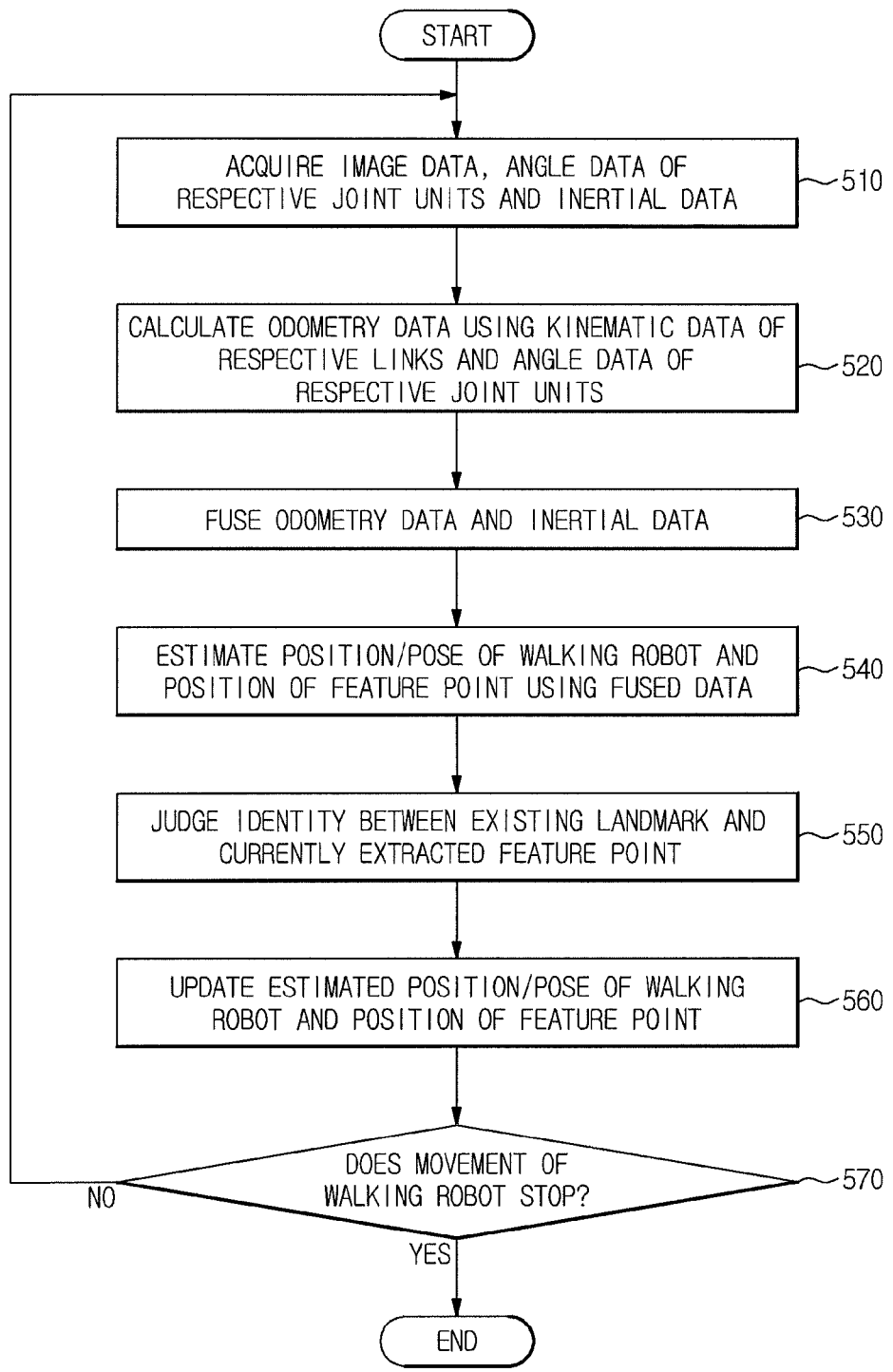

WALKING ROBOT AND SIMULTANEOUS LOCALIZATION AND MAPPING METHOD THEREOF

CROSS-REFERENCE TO RELATED APPLICATIONS

This application claims the benefit of Korean Patent Application No. 2010-0131790, filed on Dec. 21, 2010 in the Korean Intellectual Property Office, the disclosure of which is incorporated herein by reference.

BACKGROUND

1. Field

Embodiments relate to a walking robot which simultaneously produces a map corresponding to a space about which the robot moves and estimates the position of the robot using image data captured by cameras, and a simultaneous localization and mapping method thereof.

2. Description of the Related Art

In general, walking robots refer to robots which move using two or more legs in the same manner as animals or humans. These walking robots pass over obstacles unlike wheeled robots, and particularly, bipedal walking robots are favorable when working in the same living space as humans due to the external appearance thereof being similar to humans and are regarded as the key technology of humanoid robots due to the external appearance thereof without repulsing humans.

In order to enable a walking robot to plan a path to a desired destination within a space about which the robot moves and to autonomously walk, it needs to be assumed that the walking robot recognizes the position thereof within an indoor space in real time.

As one method to recognize the position of a walking robot, artificial landmarks are used. Through such a method, specific artificial landmarks distinguished from the background of a space about which the walking robot moves are installed in advance and are recognized using position sensors, such as vision sensors (cameras) or ultrasonic sensors mounted on the walking robot, thereby enabling the walking robot to recognize the current position thereof. The walking robot, which has position (coordinate) data of the artificial landmarks with respect to the coordinates of an origin in advance, measures relative positions of the walking robot with respect to the artificial landmarks, thus measuring a current position of the walking robot with respect to the coordinates of the origin. Through such a position recognizing method using artificial landmarks, if the landmarks are successfully detected, absolute position data are obtained, but if detection of the landmarks fails due to shielding of the landmarks, position data are not obtained and when the size of a space about which a positioning system will be built is increased, a burden due to installation of the landmarks is increased. Further, in order to apply the position recognizing method using artificial landmarks, constraint in that the walking robot recognizes position (coordinate) data of the artificial landmarks present within a space about which the walking robot moves in advance is required.

As another method to recognize the position of a walking robot, natural landmarks are used. Through such a method, additional artificial landmarks are not installed in a space about which the walking robot moves, and peculiar objects in an environment are used as landmarks to recognize a current position of the walking robot. As one representative example of the above method, there is simultaneous localization and mapping (SLAM) technology. The SLAM technology refers to technology in which peripheral environmental data of a walking robot are detected and the detected data are processed to simultaneously produce a map corresponding to a space (work operable space) about which the walking robot moves and estimate the absolute position of the walking robot. Recently, research into image-based SLAM technology in which vision sensors (cameras) are mounted on a main body of a waking robot and SLAM is achieved using image data captured by the cameras is underway. The walking robot simultaneously estimates position data of the walking robot and position data of landmarks using feature points extracted from the image data, captured by the cameras, as the natural landmarks. However, the walking robot has great rectilinear/rotary movement and vibration in a three-dimensional direction during walking, and such movement and vibration function as disturbances of the cameras and thus influence the image data captured by the cameras. Therefore, accurate estimation of the position of the walking robot using only the image data captured by the cameras is substantially difficult, and thus research into measures to overcome such a problem is underway.

SUMMARY

Therefore, it is an aspect of an embodiment to provide a walking robot and a simultaneous localization and mapping method thereof in which odometry data acquired during movement of the walking robot are applied to image-based SLAM technology so as to improve accuracy and convergence of localization of the walking robot.

Additional aspects of embodiments will be set forth in part in the description which follows and, in part, will be obvious from the description, or may be learned by practice of embodiments.

In accordance with an aspect of an embodiment, a simultaneous localization and mapping method of a walking robot includes acquiring image data of a space about which the walking robot walks and rotational angle data of rotary joints relating to walking of the walking robot, calculating odometry data using kinematic data of respective links constituting the walking robot and the rotational angle data, and localizing the walking robot and mapping the space about which the walking robot walks using the image data and the odometry data.

The odometry data may include position data and pose data of the walking robot with respect to a coordinate system, using a point where the walking robot starts to walk as an origin, in the space about which the walking robot walks.

The rotary joints relating to walking of the walking robot may include a plurality of rotary joints constituting hip joint units, knee joint units and ankle joint units.

The kinematic data of the respective links used in the calculation of the odometry data may be kinematic data of respective links of a walking robot model from which feet and the ankle joint units are removed.

The localization of the walking robot and the mapping of the space about which the walking robot walks may include estimating position data and pose data of the walking robot and position data of a feature point using the current acquired image data and the odometry data, judging identity between a stored existing landmark and the feature point extracted from the current acquired image data, and updating the estimated position data and pose data of the walking robot and the position data of the feature point registered as a landmark using position data of the existing landmark and the position data of the feature point extracted from the current acquired image data and matching with the existing landmark.

In accordance with another aspect of an embodiment, a simultaneous localization and mapping method of a walking robot includes acquiring image data of a space about which the walking robot walks, rotational angle data of rotary joints relating to walking of the walking robot, and inertial data of the walking robot, calculating odometry data using kinematic data of respective links constituting the walking robot and the rotational angle data, fusing the odometry data and the inertial data, and localizing the walking robot and mapping the space about which the walking robot walks using the image data and the fused data.

The odometry data may include position data and pose data of the walking robot with respect to a coordinate system, using a point where the walking robot starts to walk as an origin, in the space about which the walking robot walks.

The rotary joints relating to walking of the walking robot may include a plurality of rotary joints constituting hip joint units, knee joint units and ankle joint units.

The kinematic data of the respective links used in the calculation of the odometry data may be kinematic data of respective links of a walking robot model from which feet and the ankle joint units are removed.

The localization of the walking robot and the mapping of the space about which the walking robot walks may include estimating position data and pose data of the walking robot and position data of a feature point using the current acquired image data and the fused data, judging identity between a stored existing landmark and the feature point extracted from the current acquired image data, and updating the estimated position data and pose data of the walking robot and the position data of the feature point registered as a landmark using position data of the existing landmark and the position data of the feature point extracted from the current acquired image data and matching with the existing landmark.

In accordance with another aspect of an embodiment, a walking robot includes an image data acquisition unit to acquire image data of a space about which the walking robot walks, rotational angle detection units to acquire rotational angle data of rotary joints relating to walking of the walking robot, and a control unit to calculate odometry data using kinematic data of respective links constituting the walking robot and the rotational angle data and to localize the walking robot and map the space about which the walking robot walks using the image data and the odometry data.

The odometry data may include position data and pose data of the walking robot with respect to a coordinate system, using a point where the walking robot starts to walk as an origin, in the space about which the walking robot walks.

The rotary joints relating to walking of the walking robot may include a plurality of rotary joints constituting hip joint units, knee joint units and ankle joint units.

The kinematic data of the respective links used in the calculation of the odometry data may be kinematic data of respective links of a walking robot model from which feet and the ankle joint units are removed.

The control unit may estimate position data and pose data of the walking robot and position data of a feature point using the current acquired image data and the odometry data, judge identity between a stored existing landmark and the feature point extracted from the current acquired image data, and update the estimated position data and pose data of the walking robot and the position data of the feature point registered as a landmark using position data of the existing landmark and the position data of the feature point extracted from the current acquired image data and matching with the existing landmark.

In accordance with a further aspect of an embodiment, a walking robot includes an image data acquisition unit to acquire image data of a space about which the walking robot walks, rotational angle detection units to acquire rotational angle data of rotary joints relating to walking of the walking robot, an inertial sensor to measure inertial data of the walking robot, and a control unit to calculate odometry data using kinematic data of respective links constituting the walking robot and the rotational angle data, to fuse the odometry data and the inertial data, and to localize the walking robot and map the space about which the walking robot walks using the image data and the fused data.

The odometry data may include position data and pose data of the walking robot with respect to a coordinate system, using a point where the walking robot starts to walk as an origin, in the space about which the walking robot walks.

The rotary joints relating to walking of the walking robot may include a plurality of rotary joints constituting hip joint units, knee joint units and ankle joint units.

The kinematic data of the respective links used in the calculation of the odometry data may be kinematic data of respective links of a walking robot model from which feet and the ankle joint units are removed.

The control unit may estimate position data and pose data of the walking robot and position data of a feature point using the current acquired image data and the fused data, judge identity between a stored existing landmark and the feature point extracted from the current acquired image data, and update the estimated position data and pose data of the walking robot and the position data of the feature point registered as a landmark using position data of the existing landmark and the position data of the feature point extracted from the current acquired image data and matching with the existing landmark.

BRIEF DESCRIPTION OF THE DRAWINGS

These and/or other aspects of embodiments will become apparent and more readily appreciated from the following description of the embodiments, taken in conjunction with the accompanying drawings of which:

FIG. 12 is a flow chart illustrating a simultaneous localization and mapping method of the walking robot in accordance with an embodiment.

DETAILED DESCRIPTION

Figure 1:
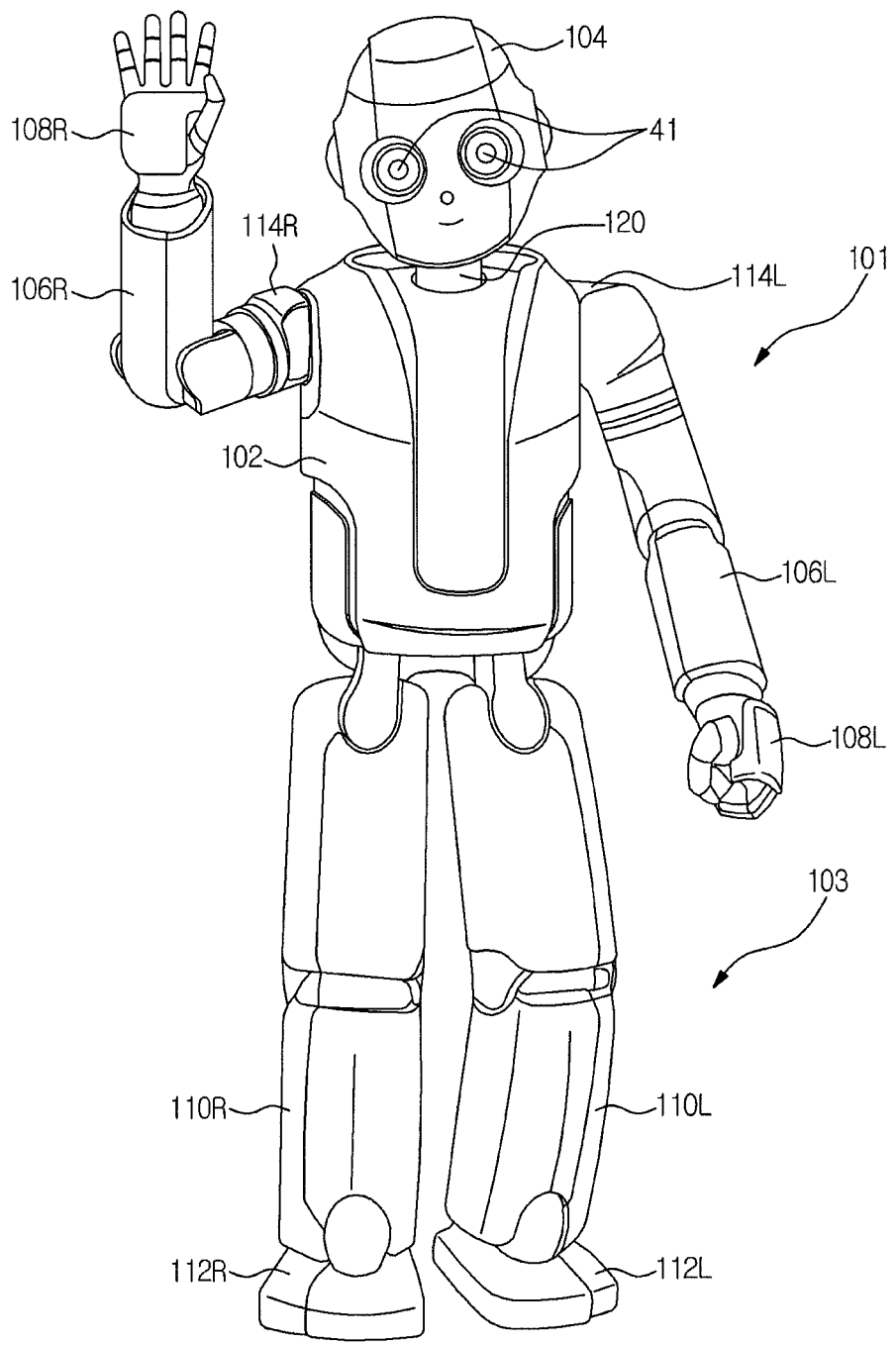
FIG. 1 is a perspective view illustrating the external appearance of a walking robot in accordance with an embodiment.

Reference will now be made in detail to embodiments, examples of which are illustrated in the accompanying drawings, wherein like reference numerals refer to like elements throughout.

FIG. 1 is a perspective view illustrating the external appearance of a walking robot in accordance with an embodiment.

As shown in FIG. 1, a humanoid robot 100 in accordance with an embodiment is a bipedal robot which walks upright with two legs 110L and 110R in the same manner as a human, and includes an upper body 101 including a torso 102, a head 104 and arms 106L and 106R and a lower body 103 including the two legs 110L and 110R.

The upper body 101 of the humanoid robot 100 includes the torso 102, the head 104 connected to the upper part of the torso 102 through a neck 120, the two arms 106L and 106R connected to both sides of the upper part of the torso 102 through shoulders 114L and 114R, and hands 108L and 108R respectively connected to the tips of the two arms 106L and 106R. Cameras 41 to capture images of a space about which the robot 100 moves are mounted in elements having the shape of a human eye on the head 104.

The lower body 103 of the humanoid robot 100 includes the two legs 110L and 110R connected to both sides of the lower part of the torso 102 of the upper body 101, and feet 112L and 112R respectively connected to the tips of the two legs 110L and 110R.

Here, "L" and "R" respectively indicate the left and right sides of the humanoid robot 100.

Figure 2:
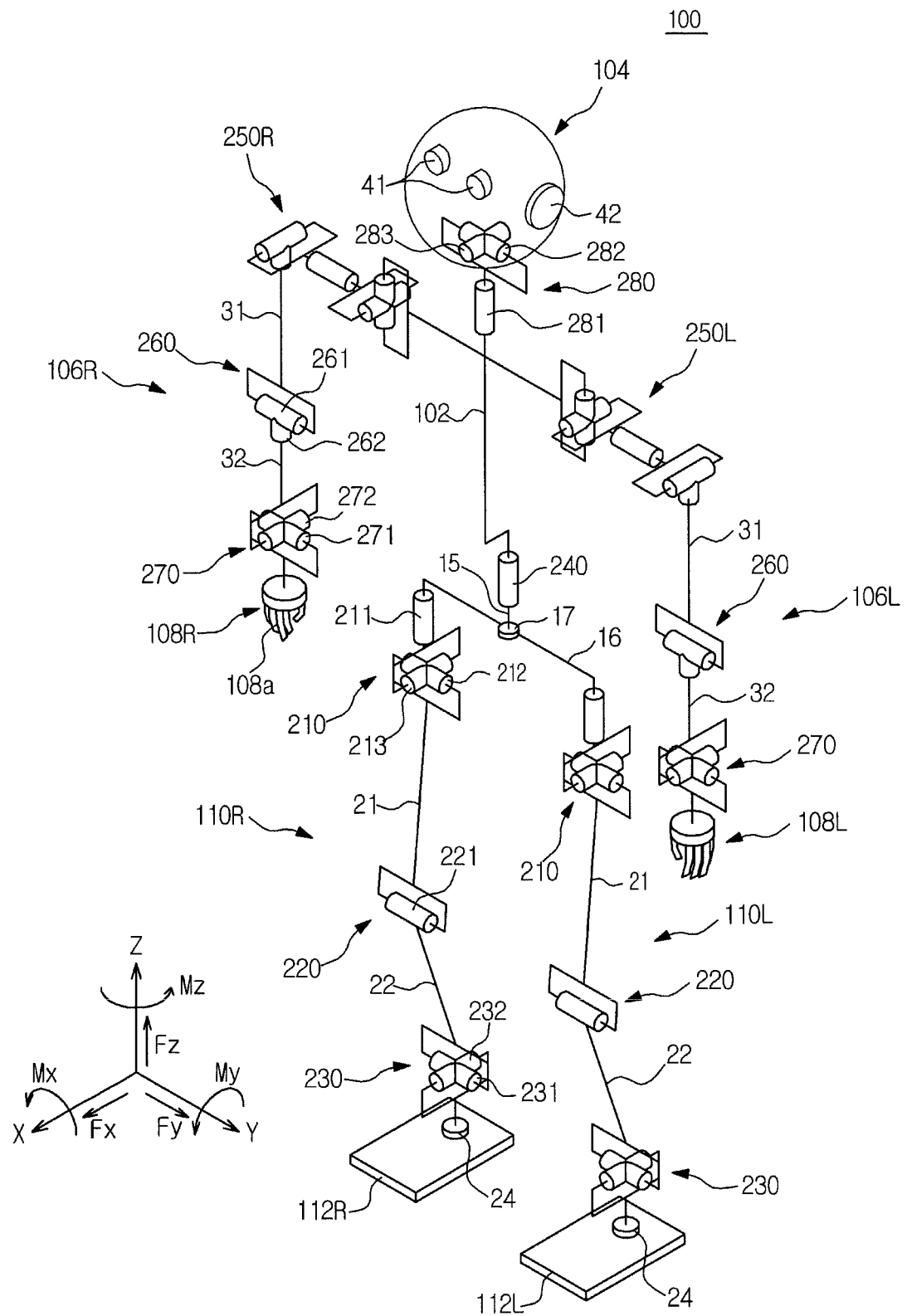
FIG. 2 is a view illustrating a main link and joint structure of the walking robot in accordance with an embodiment.

FIG. 2 is a view illustrating a main link and joint structure of the humanoid robot in accordance with an embodiment.

As shown in FIG. 2, in addition to the cameras 41 to capture images of the space about which the humanoid robot 100 moves, microphones 42 for user voice input are installed on the head 104 of the humanoid robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis) and a rotary joint 283 in the roll direction (rotated around the X-axis), and thus has 3 degrees of freedom.

Motors to rotate the head 104 (for example, actuators such as electric motors or hydraulic motors) are connected to the respective rotary joints 281, 282 and 283 of the neck joint unit 280.

The two arms 106L and 106R of the humanoid robot 100 respectively include upper arm links 31, lower arm links 32 and the hands 108L and 108R.

The upper arm links 31 are connected to the upper body 101 through shoulder joint units 250L and 250R, the lower arm links 32 are connected to the upper arm links 31 through elbow joint units 260, and the hands 108L and 108R are connected to the lower arm links 32 through wrist joint units 270.

The shoulder joint units 250L and 250R are installed at both sides of the torso 102 of the upper body 101 and connect the two arms 106L and 106R to the torso 102 of the upper body 101.

Each of the elbow joint units 260 includes a rotary joint 261 in the pitch direction and a rotary joint 262 in the yaw direction, and thus has 2 degrees of freedom.

Each of the wrist joint units 270 includes a rotary joint 271 in the pitch direction and a rotary joint 272 in the roll direction, and thus has 2 degrees of freedom.

Five fingers 108a are installed on each of the hands 108L and 108R. Each of the fingers 108a may be provided with a plurality of joints (not shown) driven by motors. The fingers 108a perform various motions, such as gripping an object and indicating a specific direction, in connection with movement of the arms 106L and 106R.

A waist joint unit 240 having 1 degree of freedom in the yaw direction (rotated around Z-axis) to rotate the upper body 101 is installed on the torso 102.

A pelvis 15 to support the upper body 101 is connected to the waist joint unit 240 installed at the lower part of the upper body 101. The pelvis 15 is connected to a hip joint unit 210 through a pelvis link 16. An inertial sensor 17, such as an inertial measurement unit (IMU), to detect pose data (angle data) of the humanoid robot 100 is installed on the pelvis link 16. The inertial sensor 17 detects relative angles of the pelvis link 16 with respect to the gravity direction and an inertial system, and generates pose data (angle data) in the roll, pitch and yaw directions. The inertial sensor 17 may be installed on the torso 102 and the head 104 as well as on the pelvis link 16.

The two legs 110L and 100R of the robot 100 respectively include thigh links 21, calf links 22 and the feet 112L and 112R.

The thigh links 21 correspond to thighs of a human and are connected to the torso 102 of the upper body 101 through hip joint units 210, the calf links 22 are connected to the thigh links 21 through knee joint units 220, and the feet 112L and 112R are connected to the calf links 22 through ankle joint units 230.

Each of the hip joint units 210 includes a rotary joint (i.e., a hip yaw joint) 211 in the yaw direction (rotated around the Z-axis), a rotary joint (i.e., a hip pitch joint) 212 in the pitch direction (rotated around the Y-axis) and a rotary joint (i.e., a hip roll joint) 213 in the roll direction (rotated around the X-axis), and thus has 3 degrees of freedom.

Each of the knee joint units 220 includes a rotary joint 221 in the pitch direction and thus has 1 degree of freedom.

Each of the ankle joint units 230 includes a rotary joint 231 in the pitch direction and a rotary joint 232 in the roll direction, and thus has 2 degrees of freedom.

Since six rotary joints are provided on the hip joint unit 210, the knee joint unit 220 and the ankle joint unit 230 of each of the two legs 110L and 110R, a total of twelve rotary joints is provided on the two legs 110L and 110R.

Multi-axis force/torque sensors 24 are respectively installed between the feet 112L and 112R and the ankle joint units 230 of the two legs 110L and 110R. The multi-axis force/torque sensors 24 measure three directional component Mx, My and Mz of moment and three directional components Fx, Fy and Fz of force transmitted from the feet 112L and 112R, thus detecting whether or not the feet 112L and 112R contact the ground and load applied to the feet 112L and 112R.

Although not shown in FIG. 2, actuators (corresponding to "drive units" of FIGS. 3 and 11), such as motors to drive the respective rotary joints using power (electric or hydraulic power), and encoders (corresponding to "rotational angle detection units" of FIGS. 3 and 11) to detect rotational angles of the respective rotary joints are installed at the respective joint units of the humanoid robot 100. A pose control unit 342 (of FIG. 3) to control overall walking of the humanoid robot 100 properly controls the actuators, thus implementing various motions of the walking robot 100.

Although this embodiment exemplarily illustrates a bipedal robot as the walking robot 100, the embodiment may be applied to walking robots having various shapes, such as a quadrupedal robot and a hexapodal robot.

Figure 3:
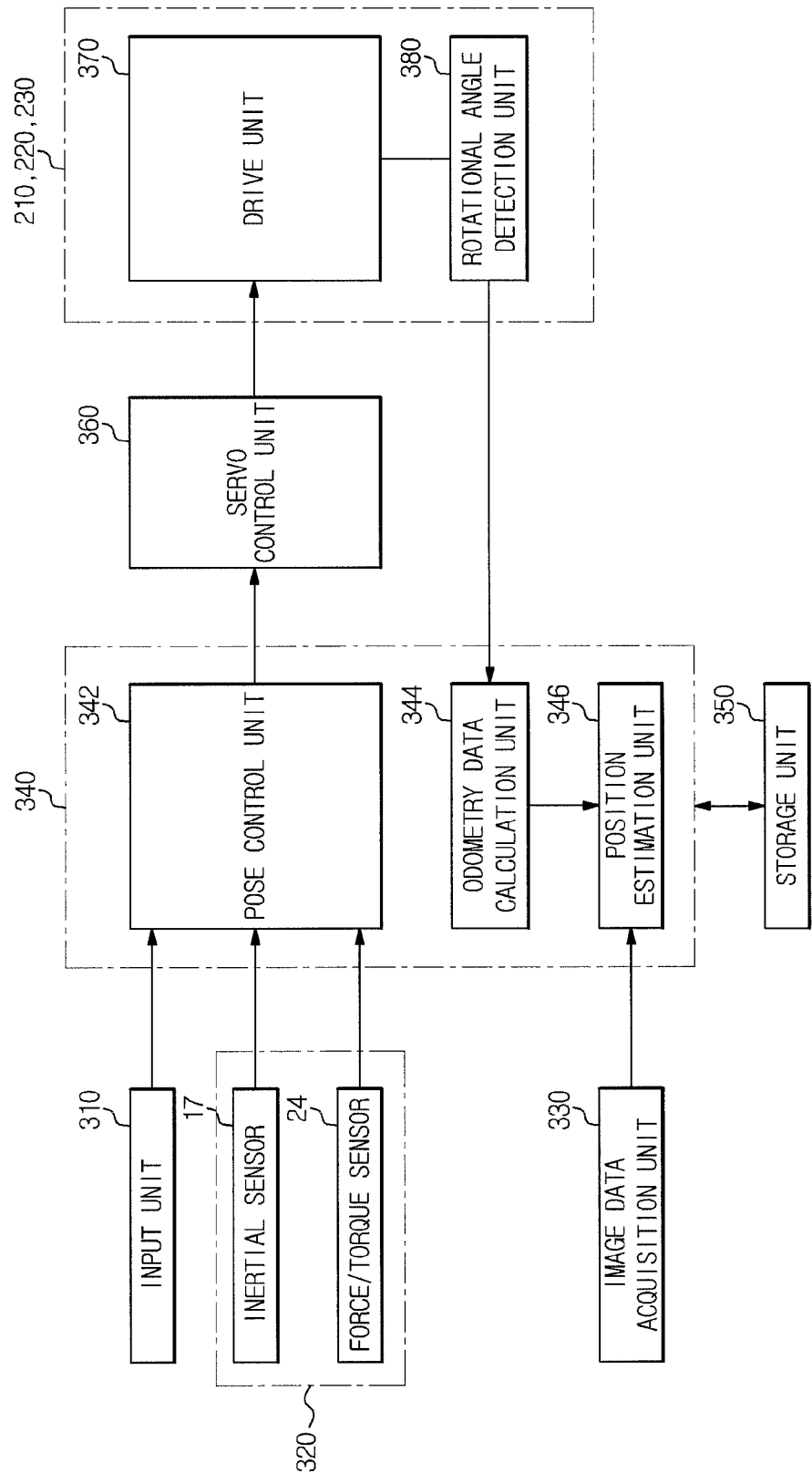
FIG. 3 is a control block diagram of the walking robot in accordance with an embodiment.

FIG. 3 is a control block diagram of the walking robot in accordance with an embodiment.

As shown in FIG. 3, the humanoid robot 100 in accordance with an embodiment includes an input unit 310, a pose detection unit 320, an image data acquisition unit 330, a control unit 340, a storage unit 350, a servo control unit 360, drive units 370 and rotational angle detection units 380.

The input unit 310 serves to allow a user to input a motion command (for example, a walking command, a work command, etc.) to the humanoid robot 100, and may include a user interface (UI) or a remote controller.

The pose detection unit 320 includes the inertial sensor 17 to measure tilts and rotational angles of the pelvis link 16 in the roll, pitch and yaw directions, and the multi-axis force/torque sensors 24 respectively installed between the feet 112L and 112R and the ankle joint units 230 of the humanoid robot 100 to detect whether or not the feet 112L and 112R contact the ground.

Here, the inertial sensor 17 serves to measure various data related to navigation, such as velocity, acceleration and direction (angle) of the humanoid robot 100, and includes a tilt sensor to measure an angle and an angular velocity sensor to measure an angular velocity. An accelerometer is used as the tilt sensor and a rate gyroscope is used as the angular velocity sensor.

The image data acquisition unit 330 detects light reflected from a subject and converts the light into a digital signal, thus capturing images of a space about which the humanoid robot 100 moves. For this purpose, the image data acquisition unit 330 includes the cameras 41 to capture the images of the space about which the humanoid robot 100 moves and an image processing module to receive output of the cameras 41 and to generate 2D image and 3D distance data. As the cameras 41, charge-coupled device (CCD) cameras, complementary metal oxide (CMOS) cameras or time of flight (TOF) cameras may be used. In addition, any devices which acquire image data regarding an object located on a walking path of the humanoid robot 100 may be used as the cameras 41.

The control unit 340 serves to control overall motion of the humanoid robot 100, and includes the pose control unit 342, an odometry data calculation unit 344 and a position estimation unit 346.

The pose control unit 342 includes a proportional-derivative (PD) controller or a proportional-integral-derivative (PID) controller to control the pose of the walking robot 100 based on the user command received through the input unit 310, the tilts and rotational angle data of the walking robot 100 in the roll, pitch and yaw directions detected by the inertial sensor 17, and the data (whether or not the feet 112L and 112R contact the ground and which feet serve as contacting and swing feet) of the walking robot 100 detected by the force/torque sensors 24. The pose control unit 342 generates target rotational angles of the rotary joints installed on the respective legs 110L and 110R of the walking robot 100, calculates joint torques τ to track the generated target rotational angles, and outputs the calculated joint torques τ to the servo control unit 360.

The odometry data calculation unit 344 serves to calculate a position (coordinates) and a pose (angles) of the walking robot 100 with respect to a coordinate system (i.e., a coordinate system using a point where the walking robot starts to walk as an origin) in the space about which the walking robot 100 moves per control cycle of the walking robot 100. The odometry data calculation unit 344 calculates odometry data through forward kinematics using kinematic data (i.e., length data) of respective links constituting the walking robot 100 stored in advance in the storage unit 350 and rotational angle data of the respective rotary joints (hereinafter, referred to as "joint angle data") detected by the rotational angle detection units 380.

The position estimation unit 346 applies a SLAM algorithm to the image data acquired by the image data acquisition unit 330 and the odometry data calculated by the odometry data calculation unit 344, thus simultaneously estimating the position of the walking robot 100 and producing a map corresponding to the space about which the walking robot 100 moves. In the SLAM algorithm, the position of a feature point and position data and pose data of the walking robot 100 are simultaneously estimated through a stochastic filter technique using one state variable, and the SLAM algorithm is carried out through repetition of a prediction stage, a data association stage and an update stage. Here, an extended Kalman filter or a particle filter may be used as a stochastic filter.

The storage unit 350 is a memory to store data necessary to execute localization of the walking robot 100 in advance and to store results of localization. That is, the storage unit 350 stores kinematic data (i.e., length data) of links (elements to connect a joint unit to another joint unit) of a conventional walking robot model (with feet) and a walking robot model (without feet), the results of localization of the walking robot 100 calculated using the SLAM algorithm during a walking process of the walking robot 100, and a map of the space (working space) about which the walking robot 100 moves, produced using the SLAM algorithm.

Although the present embodiment exemplarily illustrates the storage unit 330 as being separately provided so as to store the data necessary to perform localization in advance and to store the results of localization, the storage unit 330 may be omitted and a memory provided in the control unit 340 to store data necessary to perform localization in advance may be employed.

The servo control unit 360 outputs torque control signals corresponding to the joint torques τ to track the target rotational angles transmitted from the pose control unit 342 to the drive units 360 to drive the respective rotary joints of the hip joint units 210, the knee joint units 220 and the ankle joint units 230.

The drive units 370 are actuators, such as motors to transmit electric or hydraulic power to the respective rotary joints of the joint units, and drive the respective rotary joints of the hip joint units 210, the knee joint units 220 and the ankle joint units 230 according to the torque control signals transmitted from the servo control unit 360. In the case of a bipedal robot, since two legs, each of which includes six rotary joints (a hip joint unit having 3 degrees of freedom, a knee joint unit having 1 degree of freedom and an ankle joint unit having 2 degrees of freedom), are provided, a total of twelve actuators is necessary to drive these rotary joints.

The rotational angle detection units 380 serve to detect rotational angles of the actuators (drive units) installed to drive the respective rotary joints provided on the hip joint units 210, the knee joint units 220 and the ankle joint units 230, and encoders may be used as the rotational angle detection units 380.

Figure 4:
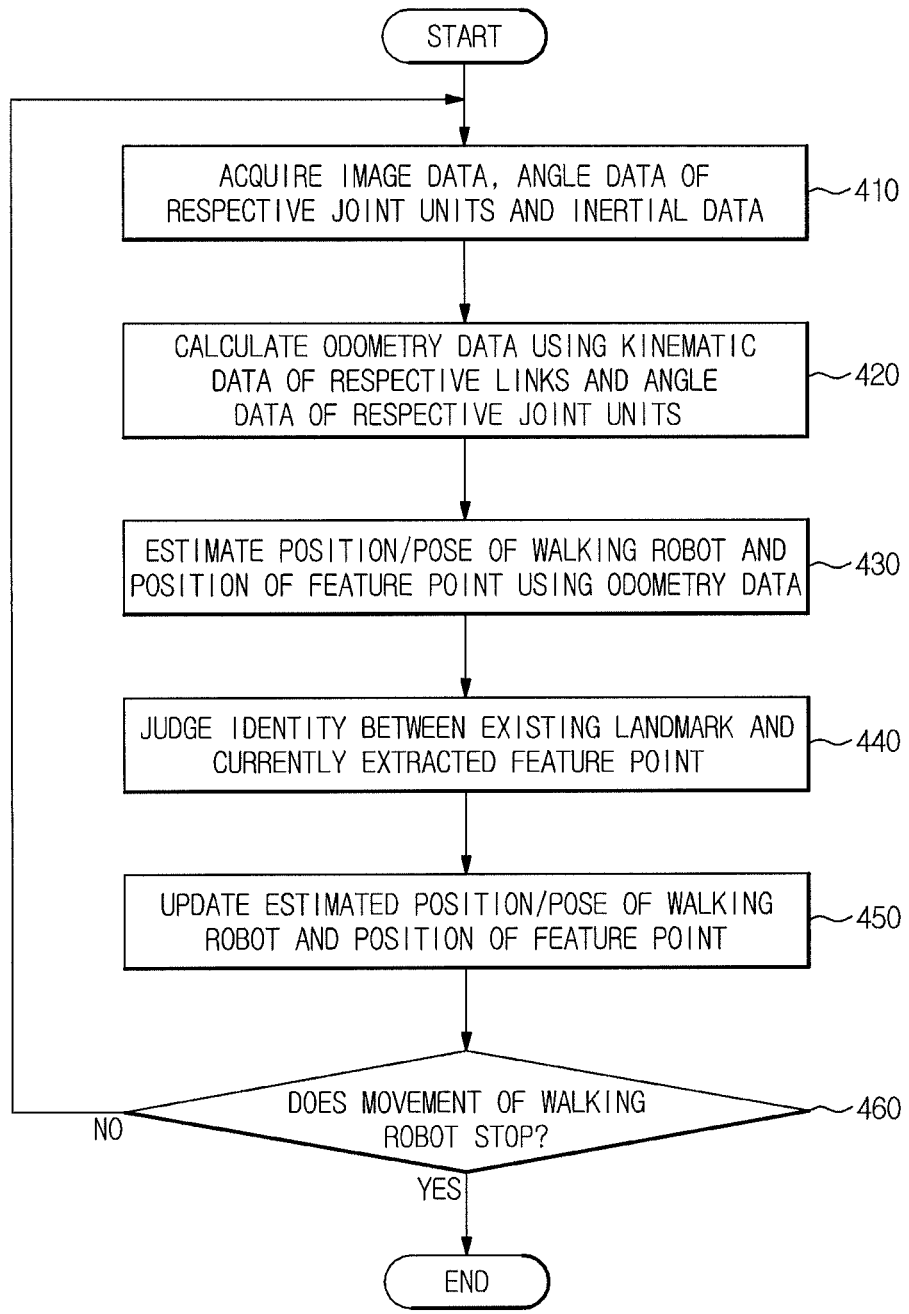
FIG. 4 is a flow chart illustrating a simultaneous localization and mapping method of the walking robot in accordance with an embodiment.

Hereinafter, with reference to FIG. 4, a simultaneous localization and mapping method of the walking robot in accordance with an embodiment will be described.

As the initial condition to describe the motion of the humanoid robot 100 in accordance with this embodiment, it is assumed that kinematic data (i.e., length data) of links (elements connecting a joint unit to another joint unit) of a walking robot model (with feet) are stored in advance in the storage unit 350 as data to perform localization of the walking robot 100.

When the humanoid robot 100 receives a walking command from a user through the input unit 310, the humanoid robot 100 starts to walk.

When the humanoid robot 100 starts to walk, the control unit 340 performs a walking motion while periodically receiving the image data of a surrounding environment from the image data acquisition unit 330, the rotational angle data of the actuators installed on the respective rotary joints (a total of twelve rotary joints) of the hip joint units 210, the knee joint units 220 and the ankle joint units 230 from the rotational angle detection units 370 and the inertial data (the tilts and rotational angle data of the walking robot 100 in the roll, pitch and yaw directions) from the inertial sensor 17 (Operation 410).

While the walking motion of the walking robot 100 is performed, the odometry data calculation unit 344 of the control unit 340 calculates odometry data using the kinematic data of the respective links stored in advance in the storage unit 350 and the rotational angle data of the respective rotary joints received from the rotational angle detection units 370, and outputs the calculated odometry data to the position estimation unit 346 of the control unit 340 (Operation 420). A process to calculate the odometry data will be described in detail later with reference to FIGS. 6(a) to 10(c).

Thereafter, the position estimation unit 346 estimates current position/pose data of the walking robot 100 and position data of a feature point from position/pose data of the walking robot 100 estimated in the previous update stage and position data of a landmark using the odometry data calculated by the odometry data calculation unit 344 (Operation 430). Such a process corresponds to the prediction stage of the SLAM algorithm.

Thereafter, the position estimation unit 346 judges identity between the existing landmark stored in the storage unit 350 and the feature point extracted from the current acquired image data (Operation 440). That is, the position estimation unit 346 judges whether or not the feature point extracted from the current image data acquired through a tracking and matching process of the feature point is used as the existing landmark or is registered as a new landmark. Such a process corresponds to the data association stage of the SLAM algorithm.

Thereafter, the position estimation unit 346 updates the estimated position/pose data of the walking robot 100 and the position data of the feature point registered as the existing landmark using the position data of the feature point registered as the existing landmark and the position data of the feature point extracted from the current acquired image data and matching with the existing landmark (Operation 450). Such a process corresponds to the update stage of the SLAM algorithm.

Thereafter, the control unit 340 judges whether or not movement of the walking robot 100 is stopped (Operation 460). The control unit 340 judges that movement of the walking robot 100 is stopped if the control unit 340 receives a walking stop command from the user through the input unit 310 or no longer receives the rotational angle data from the rotational angle detection units 380.

Upon judging that the movement of the walking robot 100 is not stopped ('No' of Operation 460), the control unit 340 returns to Operation 410 and thus continuously performs the walking motion while periodically receiving the image data, the rotational angle data of the respective rotary joints and the inertial data. On the other hand, upon judging that the movement of the walking robot 100 is stopped ('Yes' of Operation 460), the control unit 340 stores a finally produced map of the space about which the walking robot 100 moves in the storage unit 350, and completes the SLAM algorithm of the walking robot 100.

Figure 5:
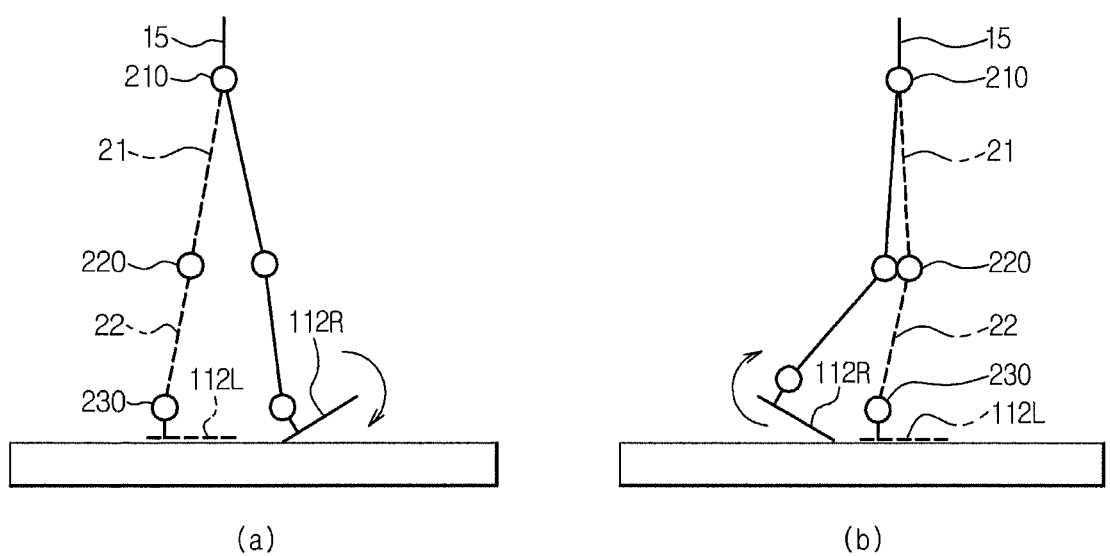
FIGS. 5(a) and 5(b) are views illustrating a torque-based finite state machine (FSM) control method from among walking control methods of walking robots.

Hereinafter, with reference to FIGS. 5(a) and 5(b), a torque-based finite state machine (FSM) control method from among walking control methods of walking robots will be described.

As walking control methods of walking robots, there are a position-based zero moment point (ZMP) control method in which command angles of respective joints, i.e., command positions, are given and the joints are controlled so as to track the command positions, and a torque-based Finite State Machine (FSM) control method in which command torques of respective joints are given and the joints are controlled so as to track the command torques.

The ZMP control method is a position-based control method and thus achieves precise position control, but needs to perform precise angle control of the respective joints in order to control the ZMP and thus requires high servo gain. Further, the ZMP control method needs to avoid kinematic singularities in order to calculate the angles of the respective joints and causes a walking robot to maintain a knee bent gait during walking, thus causing the robot to have an unnatural gait differently from a human.

Therefore, in order to allow the walking robot 100 to walk with a natural gait in the same manner as that of a human, the torque-based FSM control method is proposed. As shown in FIGS. 5(a) and 5(b), the FSM control method further includes a heel-landing process (with reference to FIG. 5(a)) and a toe-off process (with reference to FIG. 5(b)) between the feet 112L and 112R and the ground, differently from the conventional ZMP control method. If the walking robot 100 walks based on the FSM control method, movement of the hip joint units 210 and other joint units 220 and 230 is relatively increased compared to walking based on the ZMP control method. Here, if the walking robot 100 in accordance with an embodiment walks based on the FSM control method, disturbance applied to the cameras 41 to capture the image of a surrounding environment is increased due to increase in the movement of the hip joint units 210, etc.

If localization of the walking robot 100 is performed using the image-based SLAM algorithm, movement and vibration of the respective joint units generated during walking of the walking robot 100 act as disturbance applied to the cameras 41 and influence image data acquired by the cameras 41. Therefore, as described above, accurate estimation of the position of the walking robot 100 using only the image data acquired by the cameras 41 is substantially difficult.

Accordingly, in an embodiment, if localization of the walking robot 100 is performed using the image-based SLAM algorithm, a method to improve performance (accuracy and convergence) of localization using the odometry data as well as the image data acquired by the cameras is proposed.

Since, if walking of the walking robot 100 is controlled based on the FSM control method, disturbance applied to the cameras 41 increases and necessity of improving performance of localization increases compared to the ZMP control method, an embodiment will describe a method to improve performance of localization of the walking robot 100 using the odometry data if the walking robot 100 walks based on the FSM control method.

Hereinafter, with reference to FIGS. 6(*a*) to 10(*c*), the process to calculate the odometry data will be described.

In an embodiment, the odometry data to be provided at the prediction stage of the SLAM algorithm are defined as position (coordinate) data and pose (angle) data acquired by the image data acquisition unit 330 (in more detail, the cameras 41) installed on the walking robot 100 with respect to a coordinate system (i.e., a coordinate system using a point where the walking robot starts to walk as an origin) in the space about which the walking robot 100 moves. However, since the odometry data are calculated in relation to the walking motion of the walking robot 100, there is no need to consider movement of the joint units 240 to 280 constituting the upper body 101 of the walking robot 100 and the odometry data may be calculated in consideration of only movement of the joint units constituting the lower body 103 of the walking robot 100, i.e., the hip joint units 210, the knee joint units 220 and the ankle joint units 230. Therefore, in an embodiment, position data and pose data of the pelvis 15 (in more detail, a contact point between the pelvis 15 and the waist joint unit 240, with reference to "pel" of FIG. 6(*a*)) with respect to the coordinate system in the space about which the walking robot 100 moves, final odometry data (data to be provided at the prediction stage of the SLAM algorithm), i.e., position data and pose data of the cameras 41 with respect to the coordinate system in the space about which the walking robot 100 moves, are calculated through the vector sum of the calculated position data and pose data of the pelvis 15 and the kinematic data of the respective links or joints connecting the pelvis 15 and the cameras 41 of the walking robot 100.

First, the odometry data calculation unit 344 repeatedly calculates the position data and pose data (hereinafter, referred to as "intermediate odometry data") of the pelvis 15 of the walking robot 100 with respect to the coordinate system using dead reckoning per control cycle of the walking motion of the walking robot 100. Intermediate odometry data in the previous stage (the pervious control cycle; (k−1) stage) is expressed as an SE3-type 3D rigid body transform matrix composed of a rotation matrix R and a translation matrix t, as stated in Equation 1 below.

$${}^oT_{pel}^{(k-1)} = \begin{bmatrix} R_{3\times3} & t_{3\times1} \\ 0 & 1 \end{bmatrix}$$ [Equation 1]

Figure 6:
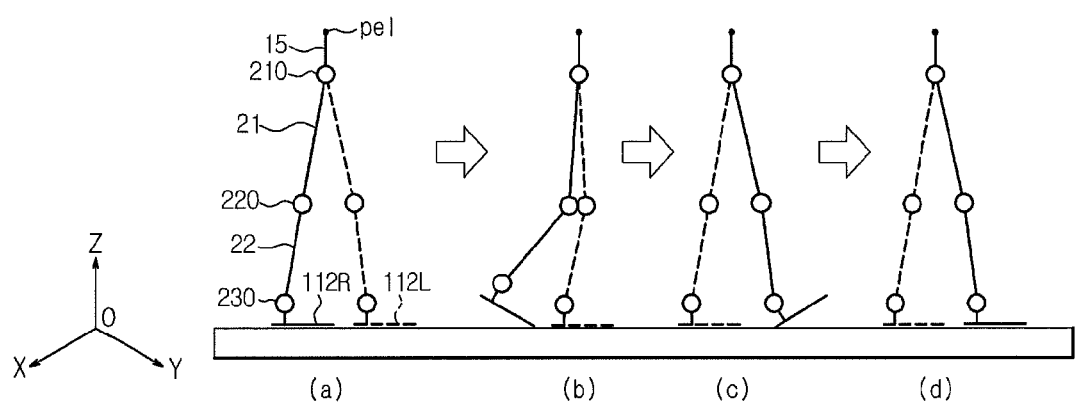
FIGS. 6(a) to 6(d) are views illustrating walking of a bipedal walking robot on a flat ground based on the torque-based FSM control method.

FIGS. 6(*a*) to 6(*d*) are views illustrating walking of the walking robot 100 on a flat ground based on the FSM control method. Here, FIG. 6(*a*) illustrates a walking standby state in which walking using the left foot 112L as a contacting foot is prepared, FIG. 6(*b*) illustrates a state in which the toe of the right foot 112R is separated from the ground, FIG. 6(*c*) illustrates a state in which the right foot 112R swings and then the heel of the right foot 112R contacts the ground, and FIG. 6(*d*) illustrates a walking standby state in which walking using the right foot 112R as a contacting foot is prepared.

In general, the walking robot 100 walks while alternating between the contacting foot and the swing foot (the same as when walking of the walking robot 100 is controlled based on the ZMP control method). Here, which foot is the swing foot and which foot is the contacting foot may be judged using data detected by the force/torque sensors 24 installed between the feet 112L and 112R and the ankle joint units 230. A position of the contacting foot cf with respect to an origin O at the (k−1) stage is calculated using kinematic data from the pelvis pel to the contacting foot cf calculated using intermediate odometry data at the (k−1) stage and kinematic data and joint angle data at the (k−1) stage, as stated in Equation 2 below.

$${}^oT_{cf}^{(k-1)} = {}^oT_{pel}^{(k-1)} \times {}^{pel}T_{cf}^{(k-1)}$$ [Equation 2]

Intermediate odometry data at the current stage (current control cycle; (k) stage) are calculated using kinematic data from the contacting foot cf to the pelvis pel calculated using the position of the contacting foot cf with respect to an origin O at the (k−1) stage and kinematic data and joint angle data at the (k) stage, as stated in Equation 3 below.

$${}^oT_{pel}^{(k)} = {}^oT_{cf}^{(k-1)} \times {}^{cf}T_{pel}^{(k)}$$ [Equation 3]

Figure 7:
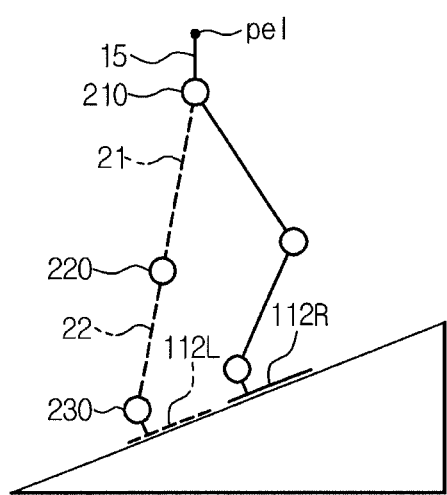
FIGS. 7(a) and 7(b) are views respectively illustrating walking of bipedal walking robots in environments where height is changed.
Figure 7:
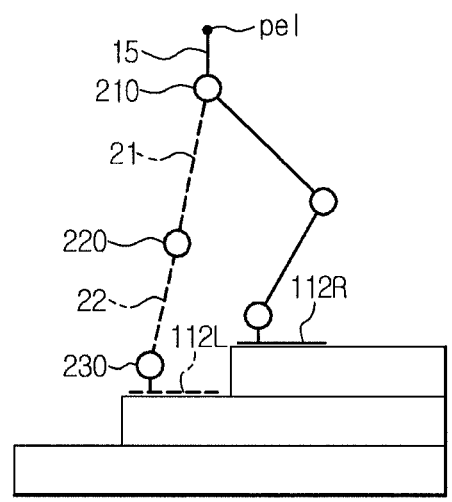

The above intermediate odometry data calculation method may be applied to walking of the walking robot 100 in an environment where height is changed, such as on an inclined ground (with reference to FIG. 7(*a*)) and a stairway (with reference to FIG. 7(*b*)) as well as walking of the walking robot 100 on the flat ground. Further, the above intermediate odometry data calculation method is applied both to walking of the walking robot 100 based on the FSM control method and walking of the walking robot 100 based on the ZMP control method.

If walking of the walking robot 100 is controlled according to the ZMP control method, performance (accuracy and convergence) of localization may be improved only by providing the final odometry data, calculated through the vector sum of the intermediate odometry data calculated using Equations 1 to 3 and the kinematic data of the links or joints connecting the pelvis 15 and the cameras 41 of the walking robot 100, at the prediction stage of the SLAM algorithm.

Figure 8:
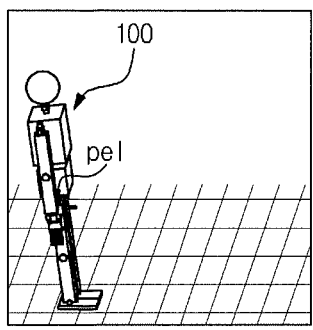
FIGS. 8(a) to 8(c) are views illustrating odometry data acquired using a conventional bipedal walking robot model (with feet) if the bipedal walking robot walks on a flat ground according to the torque-based FSM control method.
Figure 8:
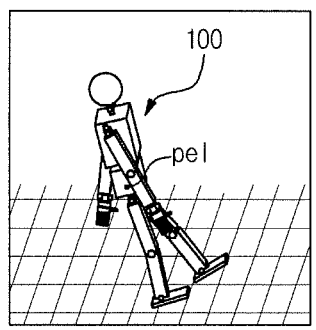
Figure 8:
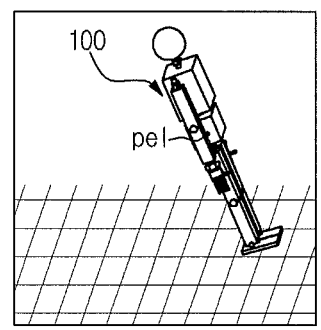
Figure 9:
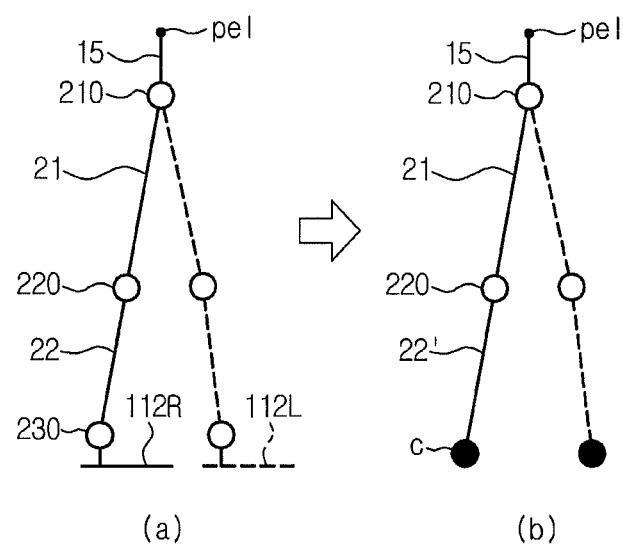
FIGS. 9(a) and 9(b) are views briefly illustrating main link and joint structures of lower bodies of the conventional bipedal walking robot model (with feet) and a bipedal walking robot model without feet.
Figure 10:
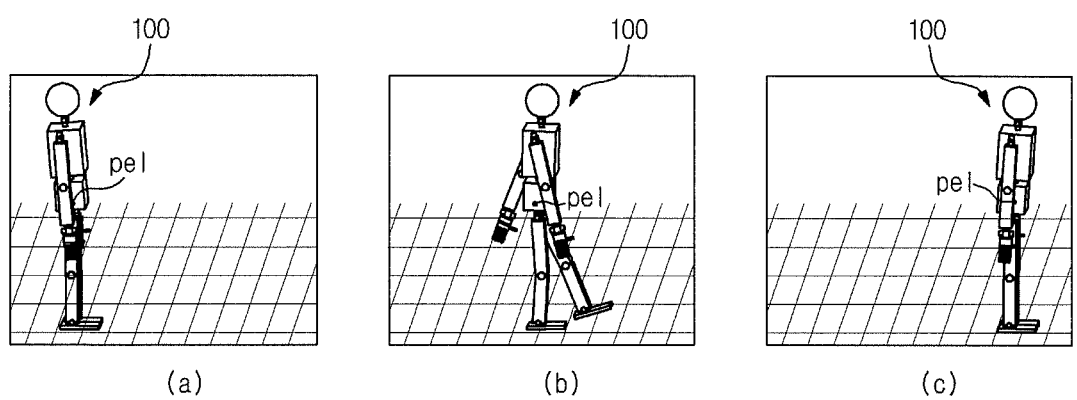
FIGS. 10(a) to 10(c) are views illustrating odometry data acquired using the bipedal walking robot model from without feet are removed if the bipedal walking robot walks on a flat ground according to the torque-based FSM control method.

However, if walking of the walking robot 100 is controlled according to the FSM control method, when intermediate odometry data are calculated using the conventional walking robot model with feet (with reference to FIG. 9(*a*)), the intermediate odometry data as if the walking robot 100 walks on an inclined ground are calculated due to the heel-landing motion, as shown in FIGS. 8(*a*) to 8(*c*) (in order of FIGS. 8(*a*), 8(*b*) and 8(*c*)), even though the walking robot 100 substantially walks on a flat ground. If final odometry data calculated using the above abnormal intermediate odometry data are provided at the prediction stage of the SLAM algorithm, the position of a feature point estimated from the current image is inaccurate and thus tracking and matching of the feature point is not impossible, thereby causing lowering performance of localization.

Therefore, in an embodiment, intermediate odometry data are calculated using a new walking robot model (with reference to FIG. 9(*b*)) formed by removing feet from the conventional walking robot model with the feet (with reference to FIG. 9(*a*)). As shown in FIG. 9(*b*), the new walking robot model is the same as the conventional walking robot model (with reference to FIG. 9(*a*)) except for absence of feet, and includes calf links 22' which extend from the calf links 22 (corresponding to calves of a human) of the conventional walking robot model to the soles of the feet 112L and 112R of the conventional walking robot model. Here, the calf links 22' of the new walking robot model corresponding to the calf links 22 of the conventional walking robot model connect knee joint units 220 to contact points c between the legs and the ground (ankle joint units 230 being removed).

If the intermediate odometry data are calculated using such a walking robot model without feet, the intermediate odometry data may be calculated when the walking robot 100 walks on an inclined ground or a stairway as well as when the walking robot 100 walks on a flat ground, in the same manner as calculation of intermediate odometry data using the conventional walking robot model.

Further, the walking robot model without feet does not include the ankle joint units 230, and thus influence of the heel-landing motion may be minimized. Therefore, if the walking robot 100 walks straight on a flat ground according to the FSM control method, when intermediate odometry data are calculated using the walking robot model without feet, normal intermediate odometry data are calculated, as shown in FIGS. 10(a) to 10(c) (in order of FIGS. 10(a), 10(b) and 10(c)). Thereby, even if walking of the walking robot 100 is controlled according to the FSM control method in which disturbance applied to the cameras 41 increases, tracking and matching of the feature point are accurately performed and thus performance of image-based localization may be improved.

When the odometry data are provided at the prediction stage of the SLAM algorithm, if the intermediate odometry data are calculated through Equations 1 to 3 using the conventional walking robot model with feet, an effect of improving localization is expected only if walking of the walking robot 100 is controlled according to the ZMP control method. On the other hand, if the intermediate odometry data calculated through Equations 1 to 3 using the new walking robot model without feet, the effect of improving localization may be expected if walking of the walking robot 100 is controlled according to the FSM control method as well as if walking of the walking robot 100 is controlled according to the ZMP control method. Therefore, it is understood that, while calculating the intermediate odometry data, use of the walking robot model without feet is more universal than use of the conventional walking robot model with feet.

In general, a balancing algorithm to balance the walking robot 100 in real time while maintaining an erect state during standing erect or walking on the ground is implemented in the control unit 340 of the walking robot 340. For this purpose, installation of the inertial sensor 17 is essential.

Therefore, another embodiment proposes a localization and mapping method of a walking robot 100 in which in order to improve accuracy of intermediate odometry data calculated using kinematic data and joint angle data, inertial data (tilts and rotating angle data of the walking robot 100 in the roll, pitch and yaw directions; expressed in a quaternion form) detected through the inertial sensor 17 are fused with the calculated intermediate odometry data, and the fused data are provided at the prediction stage of the SLAM algorithm.

Intermediate odometry data expressed as a 3D rigid body transform matrix may be expressed as a rotation matrix and a translation matrix in a vector (quaternion) form so as to perform the fusion process, as stated in Equation 4 below.

$$x = [r_{3\times 1} q_{4\times 1}]^T \quad \text{[Equation 4]}$$

The intermediate odometry data x and the inertial data $q_{imu}$ measured by the inertial sensor 17 are updated through a data fusion process based on an extended Kalman filter (EKF), and the two different data having uncertainty (the intermediate odometry data x and the inertial data $q_{imu}$) are fused through an update process based on the EKF using Equations 5 to 7 below, thus calculating more accurate intermediate odometry data x'.

$$x' = x + Kh \quad \text{[Equation 5]}$$

$$K = PH^T S^{-1} \quad \text{[Equation 6]}$$

Here, K means gain of the EKF.

$$S = HPH^T + Q_{imu} \quad \text{[Equation 7]}$$

Here, $Q_{imu}$ means a covariance matrix expressing a noise error of the inertial data measured by the inertial sensor 17.

Further, h, which is a difference between the inertial data measured by the inertial sensor 17 and the intermediate odometry data used to perform the update process based on the EKF in Equation 5 above, is calculated from the data measured by the inertial sensor 17, i.e., a quaternion, and a conjugate of the quaternion calculated from the intermediate odometry data, as stated in Equation 8 below, and a Jacobian matrix of h is obtained by directly differentiating h, as stated in Equation 9 below.

$$h = q_{imu} \times \bar{q} \quad \text{[Equation 8]}$$

$$\begin{aligned} H &= \frac{\partial h}{\partial x} \\ &= \left[ O_{4\times 3} \quad \frac{\partial (q_{imu} \times \bar{q})}{\partial q} \right] \\ &= \left[ O_{4\times 3} \quad \frac{\partial (q_{imu} \times \bar{q})}{\partial \bar{q}} \frac{\partial \bar{q}}{\partial q} \right] \end{aligned} \quad \text{[Equation 9]}$$

The fused data x' obtained by the above-described method may be applied to the image-based localization and mapping method using the odometry data in accordance with the earlier embodiment, and then influence due to an error during odometry data calculation and data detection of the inertial sensor 17 is minimized, thus achieving more accurate localization and mapping.

Figure 11:
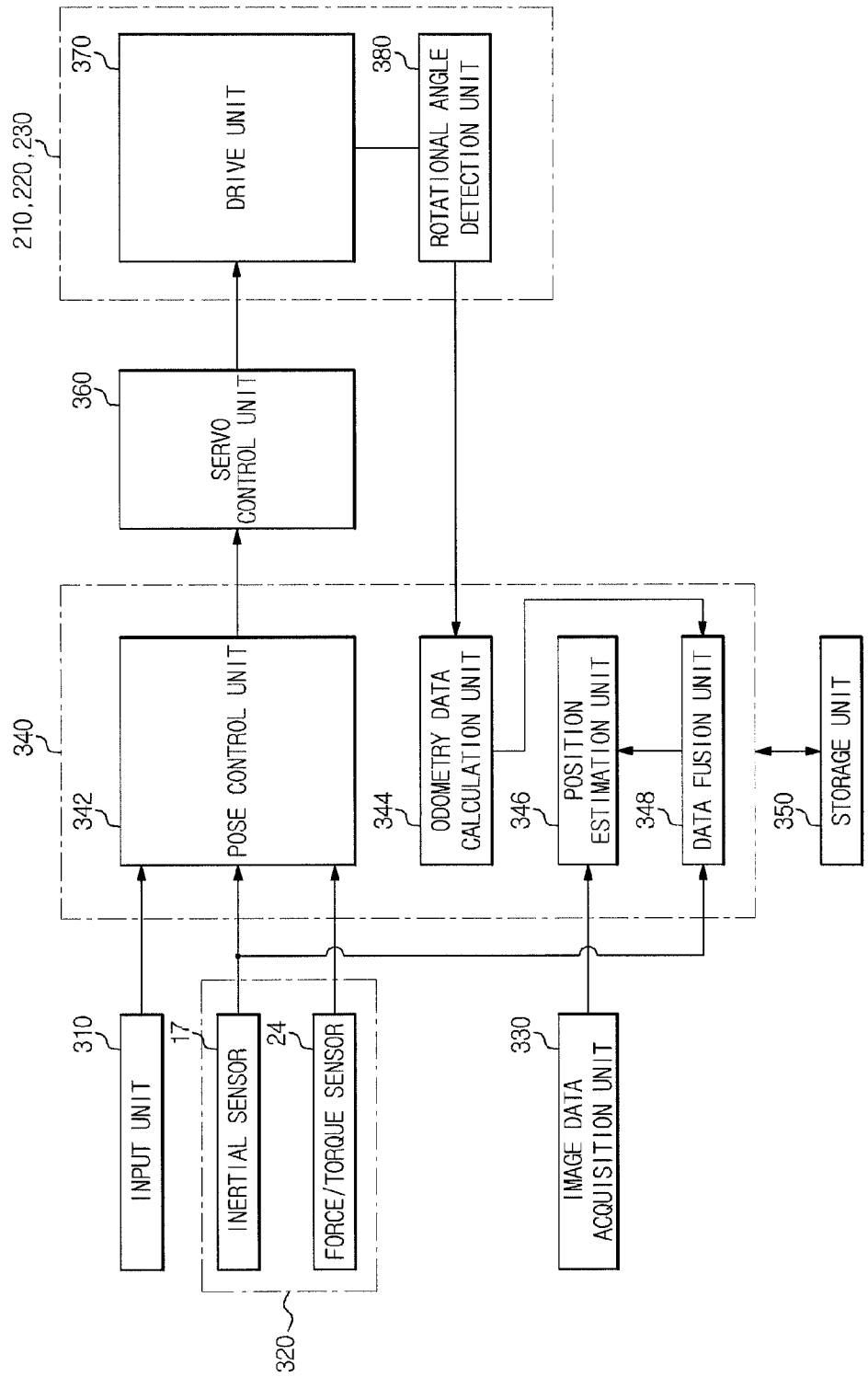
FIG. 11 is a control block diagram of a walking robot in accordance with another embodiment.

FIG. 11 is a control block diagram of a walking robot in accordance with another embodiment.

The walking robot 100 in accordance with the embodiment shown in FIG. 11 is the same as the walking robot 100 in accordance with the earlier embodiment shown in FIG. 3 except that the walking robot 100 in accordance with the embodiment shown in FIG. 11 further includes a data fusion unit 348 in the control unit 340.

As described above, the odometry data calculation unit 344 of the walking robot 100 in accordance with an embodiment shown in FIG. 3 calculates odometry data using kinematic data and joint angle data and outputs the calculated odometry data to the position estimation unit 346 at the prediction stage of the SLAM algorithm so as to perform localization and mapping using the odometry data.

On the other hand, the odometry data calculation unit 344 of the walking robot 100 in accordance with an embodiment shown in FIG. 11 does not provide odometry data, calculated using kinematic data and joint angle data, directly to the position estimation unit 346. That is, the odometry data calculation unit 344 in accordance with this embodiment outputs the calculated odometry data to the data fusion unit 348, and the data fusion unit 348 fuses inertial data (tilts and rotating angle data of the walking robot 100 in the roll, pitch and yaw directions) measured by the inertial sensor 17 with the odometry data transmitted from the odometry data calculation unit 344 and then outputs the fused data to the position estimation unit 346, thus achieving localization and mapping using the fused data (more accurate odometry data) at the prediction stage of the SLAM algorithm.

Other elements of the walking robot 100 in accordance with the embodiment shown in FIG. 11 except for the data fusion unit 348 are the same as those of the walking robot 100 in accordance with the embodiment shown in FIG. 3, and a detailed description thereof will thus be omitted.

Hereinafter, with reference to FIG. 12, a simultaneous localization and mapping method of the walking robot in accordance with this embodiment will be described.

As the initial condition to describe the motion of the humanoid robot 100 in accordance with this embodiment, it is assumed that kinematic data (i.e., length data) of links (elements to connect a joint unit to another joint unit) of each of a walking robot model with feet and a walking robot model without feet are stored in advance in the storage unit 350 as data to perform localization of the walking robot 100.

When the humanoid robot 100 receives a walking command from a user through the input unit 310, the humanoid robot 100 starts to walk.

When the humanoid robot 100 starts to walk, the control unit 340 performs a walking motion while periodically receiving the image data of a surrounding environment from the image data acquisition unit 330, the rotational angle data of the actuators installed on the respective rotary joints (a total of twelve rotary joints) of the hip joint units 210, the knee joint units 220 and the ankle joint units 230 from the rotational angle detection units 370 and the inertial data (the tilts and rotational angle data of the walking robot 100 in the roll, pitch and yaw directions) from the inertial sensor 17 (Operation 510).

While the walking motion of the walking robot 100 is performed, the odometry data calculation unit 344 of the control unit 340 calculates odometry data using the kinematic data of the respective links stored in advance in the storage unit 350 and the rotational angle data of the respective rotary joints received from the rotational angle detection units 370, and outputs the calculated odometry data to the data fusion unit 348 of the control unit 340 (Operation 520).

Thereafter, the data fusion unit 348 fuses the inertial data (tilts and rotating angle data of the walking robot 100 in the roll, pitch and yaw directions) measured by the inertial sensor 17 with the odometry data transmitted from the odometry data calculation unit 344 and then outputs the fused data to the position estimation unit 346 of the control unit 340 (Operation 530).

Thereafter, the position estimation unit 346 estimates current position/pose data of the walking robot 100 and position data of a feature point from position/pose data of the walking robot 100 estimated in the previous update stage and position data of a landmark using the fused data (the odometry data and the inertial data measured by the inertial sensor 17) the obtained by the data fusion unit 348 (Operation 540). Such a process corresponds to the prediction stage of the SLAM algorithm.

Thereafter, the position estimation unit 346 judges identity between the landmark stored in the storage unit 350 and the feature point extracted from the current acquired image data (Operation 550). That is, the position estimation unit 346 judges whether or not the feature point extracted from the current image data acquired through a tracking and matching process of the feature point is used as the existing landmark or is registered as a new landmark. Such a process corresponds to the data association stage of the SLAM algorithm.

Thereafter, the position estimation unit 346 updates the estimated position/pose data of the walking robot 100 and the position data of the feature point registered as the landmark using the position data of the feature point registered as the existing landmark and the position data of the feature point extracted from the current acquired image data and matching with the existing landmark (Operation 560). Such a process corresponds to the update stage of the SLAM algorithm.

Thereafter, the control unit 340 judges whether or not movement of the walking robot 100 is stopped (Operation 570). The control unit 340 judges that movement of the walking robot 100 is stopped if the control unit 340 receives a walking stop command from the user through the input unit 310 or no longer receives the rotational angle data from the rotational angle detection units 380.

Upon judging that the movement of the walking robot 100 is not stopped ('No' of Operation 570), the control unit 340 returns to Operation 510 and thus continuously performs the walking motion while periodically receiving the image data, the rotational angle data of the respective rotary joints and the inertial data. On the other hand, upon judging that the movement of the walking robot 100 is stopped ('Yes' of Operation 570), the control unit 340 stores a finally produced map of the space about which the walking robot 100 moves in the storage unit 350, and completes the SLAM algorithm of the walking robot 100.

As is apparent from the above description, in a walking robot and a simultaneous localization and mapping method thereof in accordance with an embodiment, odometry data acquired during movement of the walking robot are applied to image-based SLAM technology, thus improving accuracy and convergence of localization of the walking robot.

Further, in a walking robot and a simultaneous localization and mapping method thereof in accordance with another embodiment, inertial data measured by an inertial sensor are fused with odometry data acquired during movement of the walking robot and the fused data are applied to image-based SLAM technology, thus improving accuracy and convergence of localization of the walking robot.

The embodiments can be implemented in computing hardware and/or software, such as (in a non-limiting example) any computer that can store, retrieve, process and/or output data and/or communicate with other computers. For example, control unit 340 in FIGS. 3 and 11 may include a computer to perform operations and/or calculations described herein. Moreover, other components in FIGS. 3 and 11 may also include a computer to perform operations and/or calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A method comprising:
acquiring image data of a space about which a walking robot walks and rotational angle data of rotary joints relating to walking of the walking robot;

calculating, by a computer, odometry data using kinematic data of respective links constituting the walking robot and the rotational angle data; and localizing the walking robot and mapping the space about which the walking robot walks using the image data and the odometry data.

2. The method according to claim 1, wherein the odometry data include position data and pose data of the walking robot with respect to a coordinate system, using a point where the walking robot starts to walk as an origin, in the space about which the walking robot walks.

3. The method according to claim 1, wherein the rotary joints relating to walking of the walking robot include a plurality of rotary joints constituting hip joint units, knee joint units and ankle joint units.

4. The method according to claim 3, wherein the kinematic data of the respective links used in the calculation of the odometry data are kinematic data of respective links of a walking robot model from which feet and the ankle joint units are removed.

5. The method according to claim 1, wherein the localization of the walking robot and the mapping of the space about which the walking robot walks includes:

estimating position data and pose data of the walking robot and position data of a feature point using current acquired image data and the odometry data;

judging identity between a stored existing landmark and the feature point extracted from the current acquired image data; and updating the estimated position data and pose data of the walking robot and the position data of the feature point registered as a landmark using position data of the existing landmark and the position data of the feature point extracted from the current acquired image data and matching with the existing landmark.

6. A method comprising:

acquiring image data of a space about which a walking robot walks, rotational angle data of rotary joints relating to walking of the walking robot, and inertial data of the walking robot;

calculating odometry data using kinematic data of respective links constituting the walking robot and the rotational angle data;

fusing the odometry data and the inertial data; and localizing the walking robot and mapping the space about which the walking robot walks using the image data and the fused data.

7. The method according to claim 6, wherein the odometry data include position data and pose data of the walking robot with respect to a coordinate system, using a point where the walking robot starts to walk as an origin, in the space about which the walking robot walks.

8. The method according to claim 6, wherein the rotary joints relating to walking of the walking robot include a plurality of rotary joints constituting hip joint units, knee joint units and ankle joint units.

9. The method according to claim 8, wherein the kinematic data of the respective links used in the calculation of the odometry data are kinematic data of respective links of a walking robot model from which feet and the ankle joint units are removed.

10. The method according to claim 6, wherein the localization of the walking robot and the mapping of the space about which the walking robot walks includes:

estimating position data and pose data of the walking robot and position data of a feature point using current acquired image data and the fused data;

judging identity between a stored existing landmark and the feature point extracted from the current acquired image data; and updating the estimated position data and pose data of the walking robot and the position data of the feature point registered as a landmark using position data of the existing landmark and the position data of the feature point extracted from the current acquired image data and matching with the existing landmark.

11. A walking robot comprising:

an image data acquisition unit to acquire image data of a space about which the walking robot walks;

rotational angle detection units to acquire rotational angle data of rotary joints relating to walking of the walking robot; and a control unit to calculate odometry data using kinematic data of respective links constituting the walking robot and the rotational angle data and to localize the walking robot and map the space about which the walking robot walks using the image data and the odometry data.

12. The walking robot according to claim 11, wherein the odometry data include position data and pose data of the walking robot with respect to a coordinate system, using a point where the walking robot starts to walk as an origin, in the space about which the walking robot walks.

13. The walking robot according to claim 11, wherein the rotary joints relating to walking of the walking robot include a plurality of rotary joints constituting hip joint units, knee joint units and ankle joint units.

14. The walking robot according to claim 13, wherein the kinematic data of the respective links used in the calculation of the odometry data are kinematic data of respective links of a walking robot model from which feet and the ankle joint units are removed.

15. The walking robot according to claim 11, wherein the control unit estimates position data and pose data of the walking robot and position data of a feature point using current acquired image data and the odometry data, judges identity between a stored existing landmark and the feature point extracted from the current acquired image data, and updates the estimated position data and pose data of the walking robot and the position data of the feature point registered as a landmark using position data of the existing landmark and the position data of the feature point extracted from the current acquired image data and matching with the existing landmark.

16. A walking robot comprising:

an image data acquisition unit to acquire image data of a space about which the walking robot walks;

rotational angle detection units to acquire rotational angle data of rotary joints relating to walking of the walking robot;

an inertial sensor to measure inertial data of the walking robot; and a control unit to calculate odometry data using kinematic data of respective links constituting the walking robot and the rotational angle data, to fuse the odometry data and the inertial data, and to localize the walking robot and map the space about which the walking robot walks using the image data and the fused data.

17. The walking robot according to claim 16, wherein the odometry data include position data and pose data of the walking robot with respect to a coordinate system, using a point where the walking robot starts to walk as an origin, in the space about which the walking robot walks.

18. The walking robot according to claim 16, wherein the rotary joints relating to walking of the walking robot include a plurality of rotary joints constituting hip joint units, knee joint units and ankle joint units.

19. The walking robot according to claim 18, wherein the kinematic data of the respective links used in the calculation of the odometry data are kinematic data of respective links of a walking robot model from which feet and the ankle joint units are removed.

20. The walking robot according to claim 16, wherein the control unit estimates position data and pose data of the walking robot and position data of a feature point using current acquired image data and the fused data, judges identity between a stored existing landmark and the feature point extracted from the current acquired image data, and updates the estimated position data and pose data of the walking robot and the position data of the feature point registered as a landmark using position data of the existing landmark and the position data of the feature point extracted from the current acquired image data and matching with the existing landmark.

* * * * *